United States Patent
Haavisto et al.

(12) 
(10) Patent No.: US 6,320,330 B1
(45) Date of Patent: Nov. 20, 2001

(54) ILLUMINATING ELECTRONIC DEVICE AND ILLUMINATION METHOD

(75) Inventors: Janne Haavisto; Kaisa Rikkinen; Mika Rintala, all of Tampere (FI)

(73) Assignee: Nokia Mobile Phones LTD, Espoo (FI)

( * ) Notice: Subject to any disclaimer, the term of this patent is extended or adjusted under 35 U.S.C. 154(b) by 0 days.

(21) Appl. No.: 09/489,519

(22) Filed: Jan. 21, 2000

(30) Foreign Application Priority Data

Jan. 22, 1999 (FI) .......................................... 990128
May 19, 1999 (FI) .......................................... 991140

(51) Int. Cl.$^7$ ..................................................... G05F 1/00
(52) U.S. Cl. ..................... 315/291; 315/209 R; 315/307; 327/514; 327/515
(58) Field of Search ..................... 315/291, 307, 315/209 R; 327/515, 514, 540, 175

(56) References Cited

U.S. PATENT DOCUMENTS

| | | | |
|---|---|---|---|
| 4,673,865 | 6/1987 | DeLuca et al. | 323/222 |
| 4,864,193 | 9/1989 | Takada et al. | 315/71 |
| 5,548,271 | 8/1996 | Tsuchiyama et al. | 340/311.1 |
| 5,661,645 | 8/1997 | Hochstein | 363/89 |
| 5,736,881 | 4/1998 | Ortiz | 327/175 |
| 5,739,639 | 4/1998 | Johnson | 315/86 |

FOREIGN PATENT DOCUMENTS 0 567 280 A3   10/1993  (EP) .
WO 96/02970    2/1996   (WO) .

OTHER PUBLICATIONS

Electronics World, "White-light leds operate down to 1.5V" Dec. 1998. P. 16.
Japanese Patent Publication No. 9-74224, Mar. 18, 1997,. Application No. 7-250112, Application Date; Sep. 5, 1995, Inventor: Toshiyuki Kumakura.

*Primary Examiner*—David Vu
(74) *Attorney, Agent, or Firm*—Perman & Green, LLP (57) ABSTRACT

A display and keyboard illumination of battery-operated portable electronic devices using LEDs are provided. A flyback converter is modified into a dedicated converter suitable for using two LEDs and their diode-like operation is utilized. Firstly, a specified amount of energy of the battery voltage ($V_{batt}$) is stored in the coil (L) of a primary circuit until, controlled by a comparator (K). The LEDs are connected in parallel with the coil, in direction such that they substantially prevent the current leaking through them. Secondly, the coil is disconnected from the battery by a switch (SW). A comparator (K) detects when the coil current reaches a specified threshold level and, by using a control circuit (SWC), then causes the switch (SW) to become non-conductive. The self-induction of the coil builds up a voltage exceeding the forward bias of the LEDs, which (thirdly) keeps on passing the current and illuminating. Fourthly, the control circuit (SWC) receives a rising edge of a switching frequency signal and causes the switch (SW) to become conductive again. Thus, the supply power of the LEDs is substantially independent of variations in battery voltage and the illumination is substantially stable.

17 Claims, 5 Drawing Sheets

ILLUMINATING ELECTRONIC DEVICE AND ILLUMINATION METHOD

FIELD OF THE INVENTION

The present invention relates to electronic devices, particularly to the display illumination of mobile stations.

BACKGROUND OF THE INVENTION

In different kinds of small battery-operated electronic devices, such as calculators, electronic games, info displays, GPS devices (Global Positioning System), remote controls, portable CD (Compact Disc), MD (Minidisc), DVD (Digital Versatile Disc) and other players, digital cameras and particularly in mobile telephones, liquid crystal displays have commonly been used for presenting different types of data, among other things, a telephone number. Because a liquid crystal display is not by nature self-illuminating, it must be illuminated at least in the dark so that a user, even in the dark, can see the text and/or graphics presented by it. Older mobile phones mainly used their display for presenting text, less for displaying images or figures. Most commonly, a monochrome, e.g. black-and-white display has been used in them. Especially in small battery-operated mobile phones, LEDs (Light Emitting Diode) have been used as background display illumination. These are indeed very suitable for the background illumination of small displays, being components that take little space and consume little energy. This being the case, LEDs have been selected for background illumination such that their colour is pleasant to the user and the minimum voltage required for their operation is sufficiently low so that the voltage of the mobile phone's battery is sufficient for their use. For example, in a Nokia 6110 pocket telephone the display is illuminated by a set of green LEDs.

As technology has developed, it has become possible to reduce the operating voltage of mobile stations and, thus, also the output voltage of batteries. In the Nokia 6110 mobile phone, used as an example, it is possible to use as the battery a lithium battery, which comprises one battery cell. The voltage of this type of battery is approximately 4.1 V when fully charged and when partly discharged, the battery voltage is lower, approximately 3 V, at the lowest. A low voltage improves a mobile station's energy economy but at the same time, it limits the number of background illumination LED alternatives that can be used without special auxiliary equipment, because some commercially available LEDs require a higher operating voltage. This applies particularly to blue and white LEDs. For example, the operating voltage of mobile stations not only changes as the battery voltage drops, but it also otherwise pulsates, e.g. due to the substantial and pulsating power consumption of the mobile stations's transmitter, which can easily be seen as alternating illumination intensity.

However, illumination is unnecessary if no additional illumination is required, e.g. in a light operating environment. In that case, illumination consumes energy unnecessarily and shortens the battery set's operating time. In some devices, additional illumination is switched on and off according to the brightness of the environment. On the other hand, in total darkness additional illumination should not be very bright so that it does not dazzle the user. It would indeed be an advantage if the brightness of illumination could be adjusted.

In addition to the transfer of voice, plans have been made to include an image transfer functionality in future mobile stations and it should even be possible to present display colour images on the display of a mobile station. In that case, coloured background illumination distorts the colours of the display. Therefore, a colour display should most preferably be illuminated by white light. Sources of white light that are reasonably well suitable for the purpose include cold cathode fluorescence tubes, white electroluminescence panels, as well as white LEDs. Of these, cold cathode fluorescence tubes would require complex operating electronics, the tubes would break easily and the solution would be large and expensive. The problem with white electroluminescence panels is their short service life and the low quality spectrum of light. White LEDs, on the other hand, are based on blue LEDs and their use would otherwise be a good solution but they typically require a minimum of 3.2 V–3.5 V forward voltage in order to operate. However, this exceeds the minimum supply voltage value of a mobile station operated by a single cell lithium battery and requires the use of an energy converter, e.g. a switching circuit. A switching circuit adds to the price and complexity of a solution based on white LEDs and reduces the efficiency by also converting electrical energy into heat. The efficiency of a switching circuit suffers particularly when raising the voltage from a low value to one only slightly higher, for example, from three to four volts, in which case the efficiency may remain at approximately 75%, depending on the size and type of the switching circuit. The use of a switching circuit also requires a suitable oscillator circuit. In addition to the price, the disadvantage of complex structures is the space that must be reserved for them, i.e. they increase the size of a mobile station and add to its weight. Switching mode power supplies suitable for the illumination of a small battery-operated device are, among others, flyback and step up converters. In the following, special methods and equipment for LED illumination, known from prior art will be presented.

U.S. Pat. No. 4,673,865 teaches the feeding of power to a LED through a capacitive circuit by a step up, i.e. booster converter, in principle. The converter comprises both a diode and a "filter capacitor". U.S. Pat. No. 4,864, 193 presents a circuit for using a LED. A device according to the publication reduces distortion in the LED's supply voltage and, thus, improves the operation of the LED in a communication application. The power supply of a set of LEDs, presented by U.S. Pat. No. 5,661,645, comprises an independent converter capable of operating even without load, which has a diode and a large capacitor. U.S. Pat. No. 5,736,881 describes a resonant converter intended for use as an LED power supply. In addition to the LEDs, the converter also comprises a separate diode. The abstract of the invention explains that the invention is a significant improvement in the field of power sources that produce a high and steady current. The invention is not particularly suitable for the purpose of illuminating a portable device that demands a low current, wherein even the steadiness of the current is not critical. U.S. Pat. No. 5,739,639 describes an emergency power source as the power supply of a set of LEDs to be used, e.g. for the illumination of an emergency sign. However, the device is complex in structure and it comprises both capacitors and diodes, which cause power losses. The December 1998 issue of Electronics World magazine presents a circuit for the use of white LEDs using a minimum output voltage of 1.5 V. The circuit is based on a multivibrator. The circuit is described as enabling the use of LEDs that operate at a forward voltage of 3 V . . . 3.6 V, with a 3-volt battery, the voltage of which at minimum is no less than 1.5 V. The current strength of the power feed of the LEDs used cannot be adjusted.

Common to these LED power supply circuits is that they all have components that cause significant power losses, e.g.

a diode and in most cases, they also have a bulky large-valued capacitor.

Figure 1:
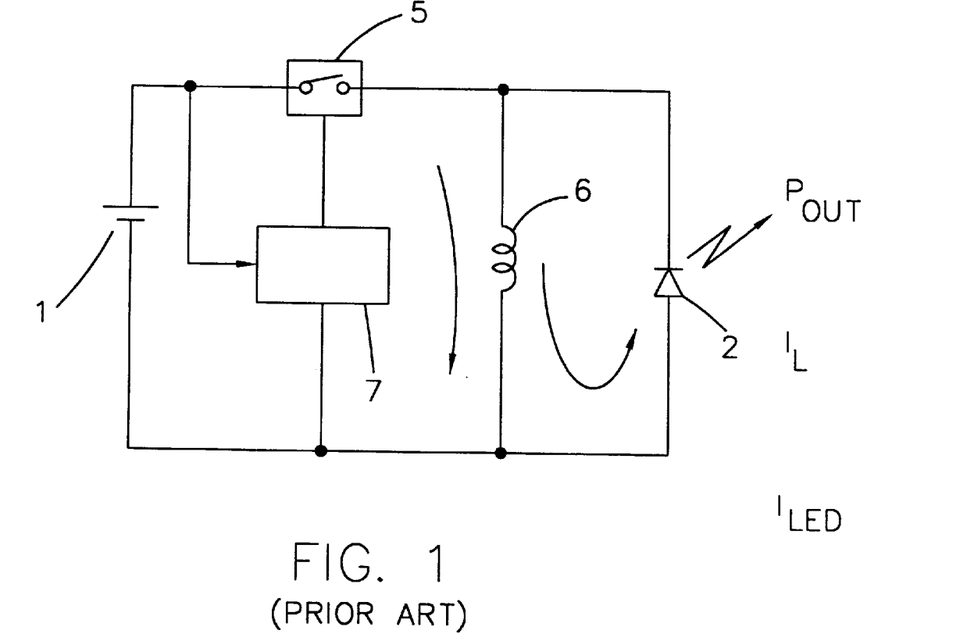
FIG. 1 shows a circuit for using an LED according to prior art.
Figure 2:
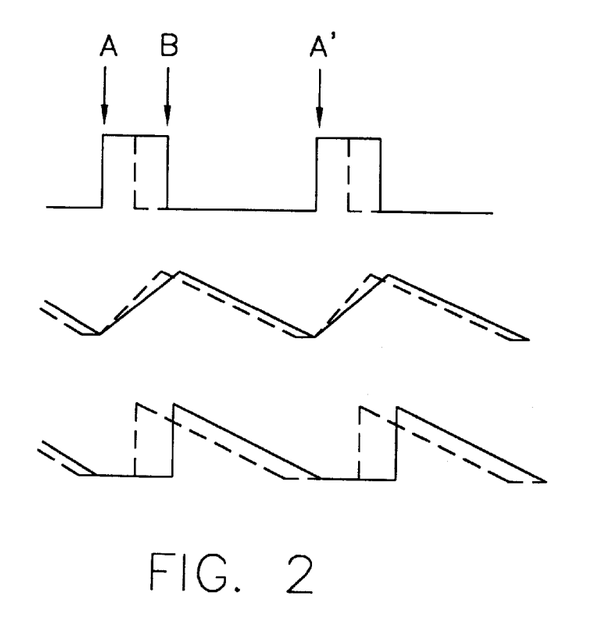
FIG. 2 is a timing chart of the circuit in FIG. 1.

Patent No. JP 9-74224 presents several different types of circuits with which the supply voltage can be lowered to the level of the forward bias voltage of the LED used. FIG. 1 shows the circuit of a step-down converter, wherein a coil 6 is connected via a semiconductor switch 5 in parallel with a direct voltage source and a LED 2 is further connected in parallel with the coil. In parallel with the direct voltage source, before the switch there is a control circuit 7. The control circuit has an output, which is connected to the switch 5 to control the operation of the switch with the help of a control signal. The control circuit measures the voltage of the voltage source and adjusts the pulse width of the control signal (PWM signal, Pulse Width Modulation) based on it. Thus, the control circuit switches the voltage source in parallel with the coil for pulses having a duration depending on the voltage of the voltage source and again renews the switching at prescribed intervals, whereupon the coil discharges its stored magnetic energy as electricity through the LED and produces light energy at a constant level. The publication also presents a feedback circuit, wherein the current that passes through the coil 6 is measured with the aid of a resistor and the coil's charging circuit is switched off by the switch 5 when the current reaches a specified threshold level. (Timing corresponds to FIG. 2). The circuit is implemented without the diode and capacitor found in an energy converter, but the circuit presupposes that the control circuit 7 must comprise an oscillator in order to produce a pulsating signal, which naturally adds to the price of the circuit and increases power consumption. Neither can the illumination power produced by the circuit be adjusted according to conditions.

SUMMARY OF THE INVENTION

Now, an illumination method and an electronic device utilising the method have been invented, in which device the background is illuminated with an LED illumination operating at a voltage higher than the voltage provided by the voltage source of the device. In an illumination method according to the invention, the voltage is raised by a back electromotive force based on the self-induction of an electromagnetic conversion means (e.g. a coil). Cyclically switching a supply voltage to the conversion means produces the required illumination voltage. The illumination voltage does not have to be made constant but instead, it is allowed to pulsate at the switching frequency of the conversion means (e.g. 50 Hz–1 MHz), because the human eye cannot in any case distinguish this type of pulsation. Instead, the illumination power is adjusted as desired so that the amount of energy used for illumination in each switching cycle is fixed and the illumination is used at a specified signal frequency. A cyclically changing signal produced by an electronic device that utilises the method is used as the signal. Digital electronics, for example, microprocessors are commonly used in current electronic devices, and for the use of digital technique, an oscillator is a practical requirement for sychronising digital signals with each other. The present invention uses exactly this feature of digital electronics by using a signal produced by electronics to replace a separate oscillator (e.g. a crystal or multivibrator) that would otherwise be needed. At the same time, adjustability of illumination is achieved. When illumination should be dimmed, the frequency of the signal used for controlling the illumination is simply lowered. Naturally, the invention can also be used in such analogue electronics, where a cyclically pulsating signal is formed. Alternatively, illumination can be adjusted by selecting one signal from among at least two signals that have different frequencies.

Preferably, in order to make the amount of electric energy produced by the switching cycle constant, the current that passes through the conversion means is fed back to control a circuit that switches the supply voltage of the conversion means to make the amount of energy to be stored in the conversion means constant. The energy E, stored in the conversion means, depends on the inductance L of the conversion means, which inductance is constant, and on the current I that passes through the coil, i.e. $E=\frac{1}{2}LI^2$. Preferably, a resistor connected in series with the coil is used in the feedback circuit to create a voltage difference proportional to the current that passes through the coil, which voltage difference is preferably further amplified by a voltage amplifier. The amplified voltage difference is supplied to a comparison means (comparator) by means of which the voltage difference is compared to a given reference voltage to enable charging of the conversion means to be terminated at the correct time. Due to use of an amplifier, the resistor can be dimensioned smaller because, with the help of the amplifier, the smaller voltage difference produced by a smaller resistance can be increased so that it is sufficient for the comparator.

According to a first aspect of the invention an illumination method is implemented to be performed by an electronic device comprising illumination electronics, the method comprising 1) initiating the charging of magnetic energy in electromagnetic conversion means and maintaining the charging;
2) finishing the charging, when the charged energy amount reaches a specified threshold level;
3) allowing at least part of the charged energy to discharge into illumination means that comprise a LED for producing light energy in response to the finishing of the charging, and the method is characterised in that it comprises
4) receiving for controlling illumination a signal independent of the operation of said illumination electronics; and
5) returning to step 1) in response to said signal.

Here, charging of electromagnetic conversion means refers to turning energy into a magnetic field by passing the current through the coil and maintaining the energy as a magnetic field.

A method according to the invention enables inexpensive and simply adjustable illumination using an LED or LEDs. The illumination intensity is proportional to the frequency of the signal received in Step 4) and, therefore, the intensity of the illumination can be changed simply by altering the frequency of the signal, whereupon the change mentioned in Step 5) will be repeated at shorter or longer intervals, and the intensity of the illumination will change.

Preferably, said signal is a cyclically pulsating signal, which is received from some electronic circuit (e.g. microprocessor) of the device, which circuit performs some function of the device (e.g. controls the device's display or runs program code).

In a method according to an alternative embodiment of the invention, in response to termination of the charging, in Step 3)

a first part of the charged energy is allowed to discharge into illumination means that comprise an LED to produce light energy; and a second part of the charged energy is allowed to discharge into conservation means for later charging the energy in the illumination means for being discharged to produce light energy during Step 1). Thus, the efficiency of illumination can be improved when the frequency of illumination determined by the signal is high, e.g. exceeds 50 kHz.

According to a second aspect of the invention, an electronic device is implemented, the device comprising illumination electronics, which illumination electronics comprise:

electromagnetic conversion means for charging energy;

illumination means comprising an LED (Light emitting diode);

initiation means for initiating the charging of magnetic energy in the electromagnetic conversion means for maintaining the charging;

terminating means for terminating the charging, when the amount of energy reaches a specified threshold level;

means for allowing at least part of the charged energy to discharge into the illumination means that comprise an LED in response to termination of the charging, and the device is characterised in that the device comprises signal means for providing a signal, independent of the operation of the illumination electronics, to the illumination electronics; and said initiation means are arranged to initiate the charging in response to said signal.

Said signal can be, for example, a sinusoidal signal, a square wave signal, a signal of arbitrary shape or, alternatively, a cyclically switched current or voltage can be used as the signal. Preferably, the initiation means comprise a switch and a control circuit, the control circuit having reception means for receiving a signal that pulsates at a specified frequency from an electronic circuit, and the control circuit is arranged to initiate the charging in response to a specified change in the signal that arrives at input for using the time of the length of the signal's given cycle part for measuring said determined time. Preferably, the signal is received from such an electronic circuit (e.g. microprocessor) that performs some function of the device other than illumination (e.g. controls the operation of the device).

The termination means preferably comprise comparison means for comparing the amount of energy stored in the conversion means with a specified threshold level with the help of the current that passes through the conversion means during the charging. The comparison means preferably comprise a resistor for producing avoltage difference that is proportional to the current that passes through the conversion means. Preferably, the comparison means also comprise a comparator, which has a first input for receiving the voltage difference and a second input for receiving a reference voltage. Preferably, the comparison means also comprise a voltage amplifier for amplifying the voltage difference so that the resistor can be dimensioned smaller and, thus, the power loss caused by the resistor can be reduced. Preferably, said control circuit comprises a second input for receiving a charging termination message and the comparator comprises an output, which is functionally connected to the second input of the control circuit. In this case, the comparator is arranged to provide the finishing message when the voltage difference reaches the reference voltage and in response to the termination message, the control circuit controls the switch to stop charging (until the next specified change in the signal again re-initiates charging).

The invention utilises already existing circuits of electronic devices from one of which a signal can be taken for controlling illumination. For establishing illumination, no separate oscillator circuit is required and, thus, there is no need to waste energy or to produce additional electromagnetic interference. At the same time, a second significant advantage of the invention can be achieved, namely controllability. If, for example, a device supports energy saving modes, illumination can be arranged to automatically save energy when the device is in energy saving mode. The power consumption of illumination decreases as the clock frequency of the circuit that controls illumination drops.

A device according to a first embodiment of the invention comprises a conservation means (capacitor) for receiving part of the charged energy in order to release it to the illumination means in response to the beginning of the subsequent charging. The capacitor is used as the conservation means to smooth the pulsation of the voltage across the illumination means so that when the switch-on mode and the switching-off mode alternate at a high frequency, the efficiency improves. In this case, the capacitor is preferably coupled to the conversion means using a diode so that the energy conserved by the capacitor discharges only into the illumination means.

In an alternative embodiment of the invention, the device further comprises conservation means for receiving a second part of the charged energy, and selective coupling means for coupling the conservation means with the illumination means in response to the initiating of the charging of magnetic energy into said electromagnetic conversion, in order to continue producing light energy by using the second part of the charged energy.

In a second embodiment of the invention, the illumination means is connected in parallel with the conversion means.

In a third embodiment of the invention, the illumination means is connected in series with the conversion means.

BRIEF DESCRIPTION OF THE DRAWINGS

In the following, the invention will be explained in detail by referring to the attached drawings, in which.

DETAILED DESCRIPTION

Figure 3:
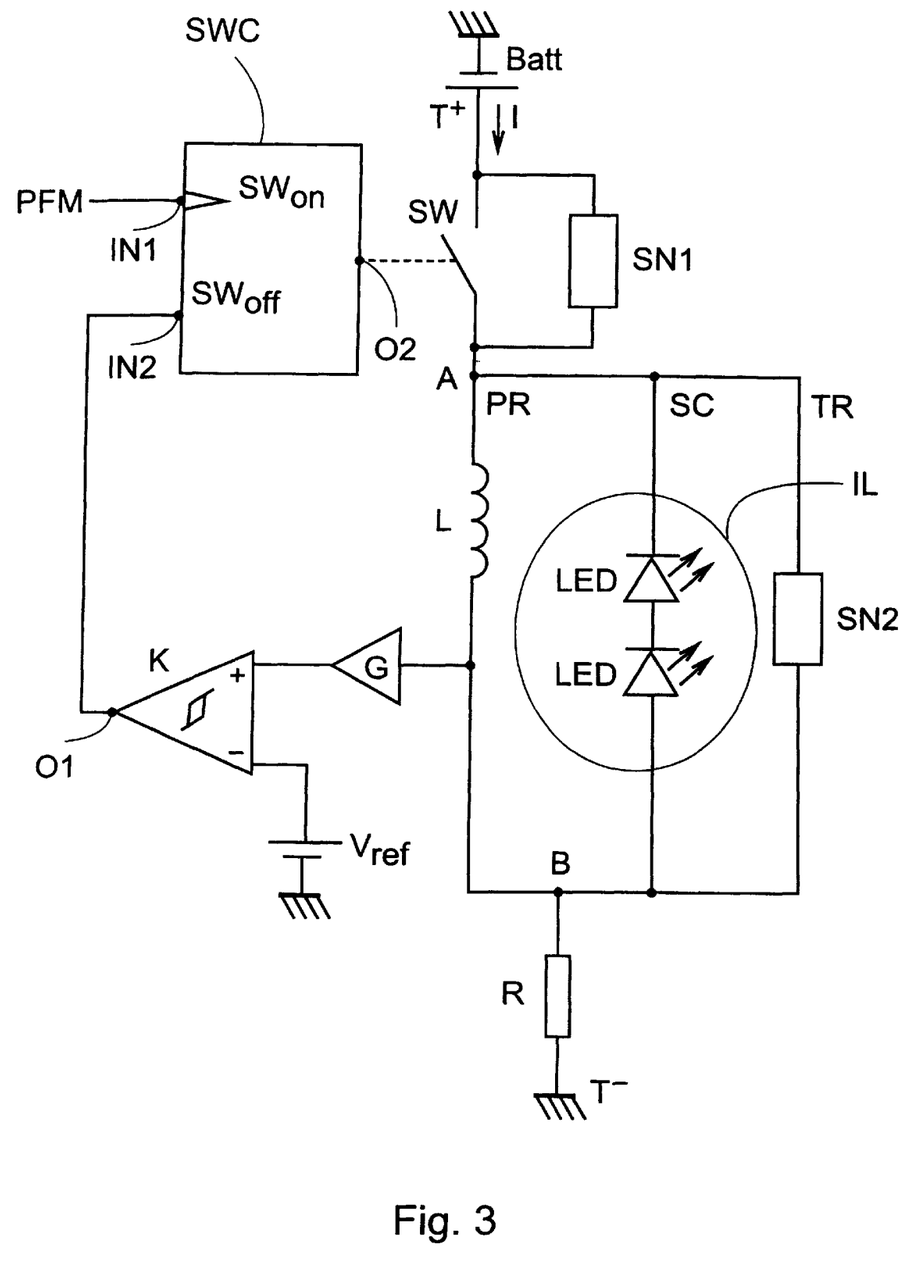
FIG. 3 is a circuit diagram of the illumination electronics of an electronic device according to the invention.

FIG. 3 shows a connection of an energy converter of a device according to the invention, as a circuit diagram. To explain the circuit diagram first the components of the circuit and their functions will first be presented briefly and only after that, the operation of the circuit will be explained in more detail. The circuit in the figure comprises two LEDs connected in series, which operate both as the load and as the diode of a fly-back-type energy converter modified according to the invention, as will be explained in more detail. The circuit comprises a voltage source Batt, which has a positive terminal $T^+$ and a negative terminal $T^-$, which here is also the ground. Connected between the terminals of the voltage source, enumerated in order beginning from the positive terminal, is first a switch SW and a first suppressor circuit SN1, connected in parallel with the switch, the function of which is to reduce switching transients caused by the switch. The switch is preferably a transistor, such as a Field Effect Transistor (FET). Three parallel branches that begin from a point A are connected between the switch and ground. The first, i.e. the primary branch PR has a coil L. The second, i.e. the secondary branch SC is formed by two LEDs connected in series, which form an illuminating unit IL. The third branch TR is connected in parallel with these, and a second suppressor circuit SN2 is connected thereto to reduce the switching transients caused by the use of the LEDs. The first, the second and the third branch join at a point B. Between point B and ground (negative terminal), there is a resistor R for measuring the current produced in the coil by the voltage source. As explained later, when the coil current reaches a certain/specified level, a trigger voltage is produced by the resistor, using which a comparator causes the switch to become non-conducting. The LEDs form the illumination element to be used for illumination, which operates both as the load and as the diode of the energy converter. The LEDs are preferably connected in series, whereupon several advantages are achieved. Firstly, when connected in series the slightly different forward bias voltages that arise due to the individual variation of the LEDs do not cause some of the LEDs to shine brighter than others, which could happen if the LEDs are connected in parallel. Secondly, LEDs normally have a limited maximum reverse voltage and the maximum voltages of LEDs connected in series is the sum of the maximum voltage of the individual LEDs. Alternatively, however, the LEDs or some of them can be connected in parallel, e.g. four LEDs can be connected as two parallel series of two LEDs.

The energy converter also comprises a control circuit SWC (Switch Controller), which controls the switch SW. The control circuit can be, e.g. a D-flip-flop, such as the 74HC74-circuit known to a person skilled in the art. The control circuit has a second output O2 for setting the switch into conductive and non-conductive states. The control circuit obtains its control from at least two inputs first IN1 of which, e.g. a signal having the form of PFM (Pulse Frequency Modulation) is supplied from some digital circuit of the device, e.g. MCU, DSP or a microprocessor. The termination message which indicates that the coil's trigger current has been reached is supplied to the second input IN2. The circuit that produces the termination message comprises a comparator K, which compares the potential across the resistor R proportional to the coil current caused by the charging of the coil, i.e. the voltage difference produced by the resistor with a given reference voltage, which is produced by, e.g. a reference voltage source $V_{ref}$. The comparator has a third input for receiving the voltage difference and a fourth input for receiving the reference voltage. The comparator has a first output O1 for supplying the control signal to the control circuit and the output is connected to the second input IN2. The reference voltage can also be formed using, e.g. the voltage of the voltage source BATT by dropping the voltage, for example, with the help of a resistor, Zener diode, voltage regulator, etc. or some other suitably sized device voltage can be used as reference voltage. Preferably, but not necessarily, the circuit also comprises a voltage amplifier G placed between the end of the resistor nearest the coil and the comparator to amplify the potential across the resistor, whereupon the resistance of the resistor can be reduced and the power loss caused by the resistor decreases.

It will be appreciated that the circuit in FIG. 3 is a preferred embodiment of the invention but it does not, however, restrict the invention merely to the circuit according to FIG. 3. The essential feature of the invention is that the switch SW always switches the current that runs from the voltage source and passes through the coil when the current reaches a suitable level. This can be implemented by placing the switch on either side of the coil, however, preferably on the side of the positive terminal of the voltage source in which case, when the switch is in a non-conductive state, the illumination of the LEDs does not produce interference voltages in the positive operating voltage. Alternatively, the current to be supplied through the coil from the voltage source can be measured by placing the resistor R between the positive terminal of the voltage source and point A; between point A and the coil; or between the coil and point B. Current measurement can also be implemented using other suitable methods instead of a resistor. It should also be noted that the current does not have to be measured, but it is sufficient that when supplying energy to the coil from the voltage source, the energy supplied to the coil, i.e. the coil current, can be compared to a specified threshold level. It will further be appreciated that the increase in current passing through the coil to a given level can naturally also be determined using the voltage difference across the coil. In other words, the comparator can equally well detect that the voltage difference across the coil drops below a given reference voltage and use this for controlling the switch to become non-conducting.

The control circuit SWC controls the switch according to its inputs so that
1) on receiving a predetermined one of a rising edge and a falling edge of the signal, e.g. a rising edge, at its first input, it causes the switch to become conductive; and
2) the termination message (e.g. a positive or negative signal) that arrives from the comparator at the second input makes the control circuit control the switch into a non-conductive state.

Figure 4:
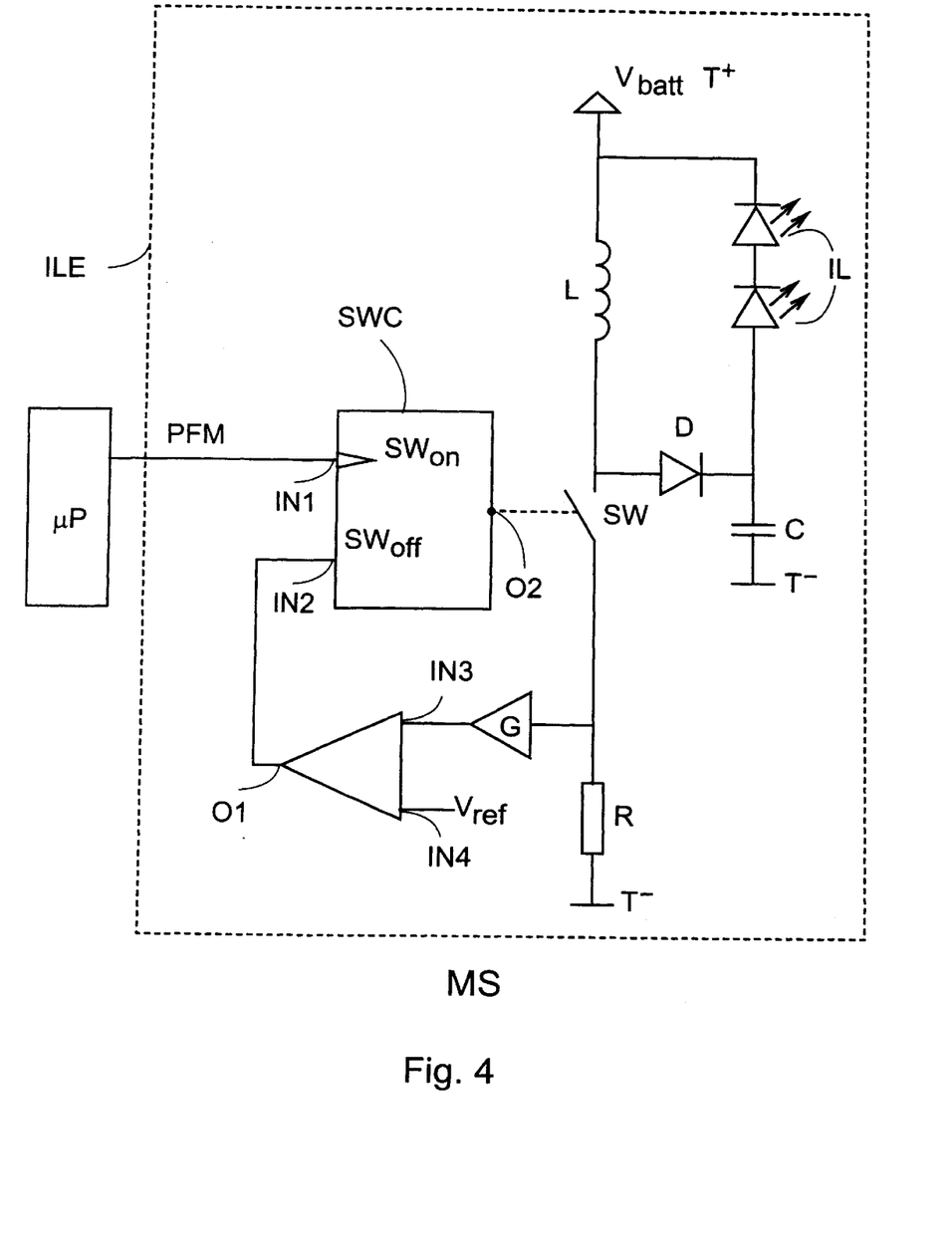
FIG. 4 is a circuit diagram of the illumination electronics of a mobile station according to a second embodiment of the invention.

FIG. 4 shows, in the form of a circuit diagram, the connection of illumination electronics ILE in a wireless mobile station MS according to a second embodiment of the invention. In addition to the mobile terminal's illumination electronics, one of the mobile terminal's digital circuits, a microprocessor μP that controls the operation of the mobile station, and is shown in the figure. (Other circuits that do not form part of the illumination electronics of the mobile station are not shown in the figure). The circuit comprises a voltage source Batt, which has a positive terminal $T^+$ and a negative terminal $T^-$, which here is also the ground. A first end of a coil L is connected to the positive terminal. The coil's second end is connected to the negative terminal through a switch SW and a resistor R. The switch is preferably a fast semiconductor switch, such as a Field Effect Transistor (FET). The first end of the coil is connected to a first end of an illumination unit IL, formed of two LEDs. The second end of the coil is connected to the second end of the illumination element through a diode D. A capacitor C is connected between the negative terminal and the second end of the illumination unit. The forward direction of both the diode D and the illumination unit IL is from the second end of the coil towards the first end so when the switch is conductive, the electric current passes through the coil but not through the diode or the illumination organ. When the switch is conductive, the coil forms a magnetic field and stores energy in that magnetic field. When the switch stops being conductive, self-induction produces in the coil a back electromotive force, which creates a current loop that circulates through the diode and the illumination organ and makes the illumination organ illuminate. At the same time, energy is being charged in the capacitor. When the switch becomes conductive again, the voltage source forms a current from the first end of the coil towards the second end of the coil, and the capacitor's charge begins to discharge through the illumination unit continuing the illumination. Alternatively, the diode and the capacitor can be omitted, whereupon the illumination unit does not illuminate when the switch is in a conductive state.

To control the charging and discharging cycles of the coil, the circuit comprises a side branch, which includes a voltage amplifier G, a comparator K and the switch control circuit SWC. The control circuit has two inputs, IN1 and IN2, as well as one output O2 for controlling the switch. The control circuit causes the switch to become conductive always when the signal that arrives at its first input changes in a specified way, e.g. there is a rising edge or a falling edge in the signal or when the signal reaches a specified current or voltage. Thus, the control circuit begins the charging of energy in the coil at prescribed intervals, the time difference between which is determined by the signal. The signal is produced by some part of the device, e.g. a microprocessor $\mu P$. In order to make the amount of energy charged in the coil during each charging cycle constant, the circuit comprises said resistor R and the comparator K, as well as means for receiving the reference voltage. The reference voltage can be generated by one of the device's circuits or it can be produced by a dedicated circuit belonging to the illumination electronics. The voltage amplifier amplifies the voltage difference between the ends of resistor R and forms an amplified voltage difference for comparison with the reference voltage $V_{ref}$ using the comparator K. When the voltage difference reaches the reference voltage, the comparator sends a termination message from its output O1 to the control circuit SWC. In response to the arrival of the termination message, the control circuit causes the switch to become non-conductive. The current passing through the resistor then switches off; the value of the voltage difference drops below the reference voltage and the comparator stops sending the termination message. However, the control circuit leaves the switching a non-conductive state until the signal causes it to become conductive again.

The circuit in FIG. 4 can be implemented, for example, with the following components: Switch SW: FET, e.g. Fairchild FDV303N Resistor R: 1 ohm SMD (Surface Mounted Device) metal film Control Circuit SWC: 74HC74 Signal: frequency 200 kHz Comparator K: Maxim. MAX999 Coil L: 100 $\mu H$ $V_{ref}$: 100 mV $V_{batt}$: min. 3.0 V IL: 2 blue LEDs, $V_{fw}$=3.6 V (typical) Diode D: $V_{fw}$=0.3 V Schottky diode, e.g. SGS Thomson BAR42 Capacitor C: 1 $\mu F$ When implemented using the components in the example, the circuit's evaluated power consumption is approximately 100 mW.

Figure 5:
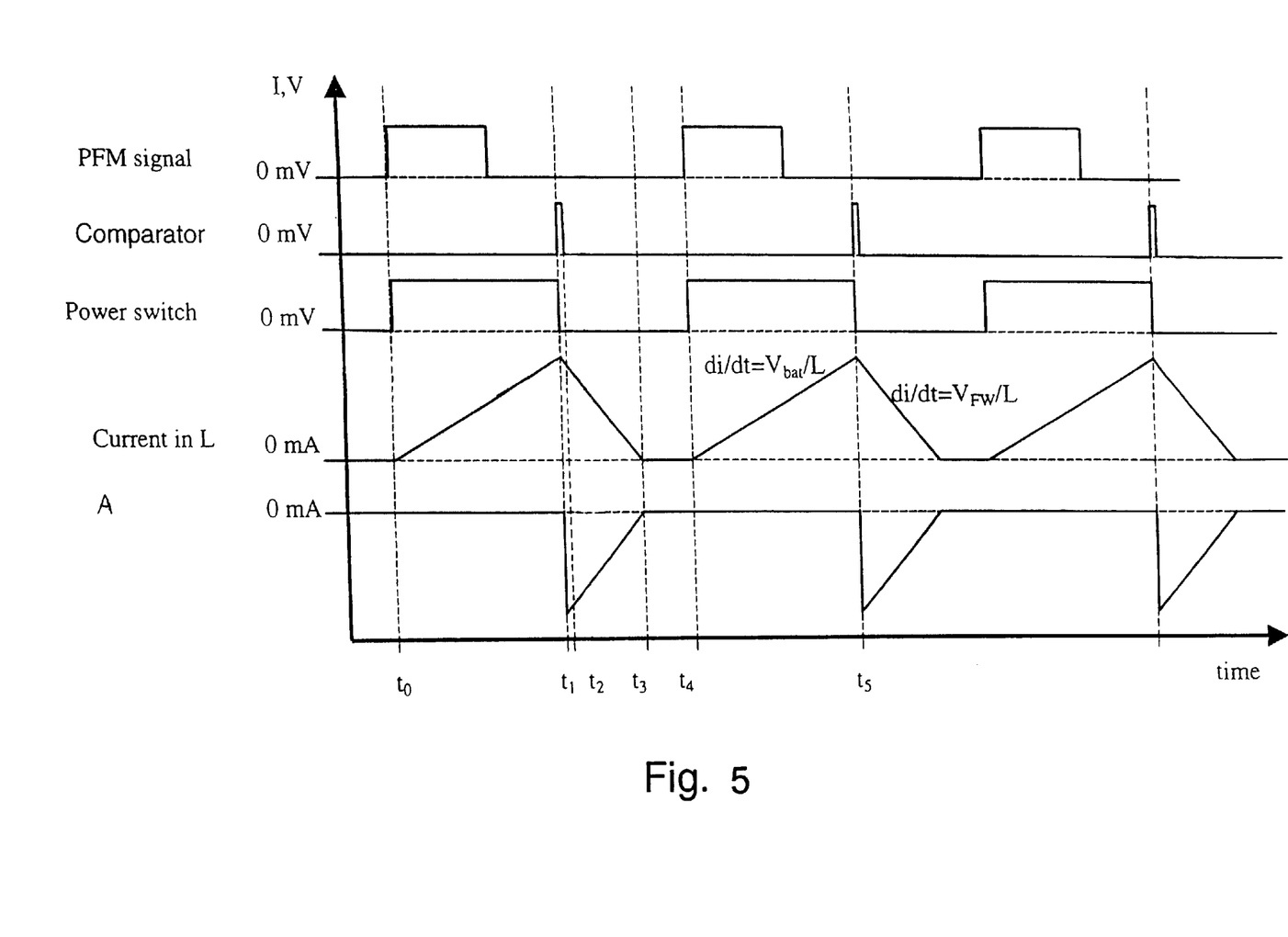
FIG. 5 is a timing chart of the circuit in FIG. 3.

FIG. 5 shows the timing plan of the connection in FIG. 3.

Let us first assume that the switch is in a non-conductive state and the coil is not carrying any current as shown on the left in FIG. 5. Thus, in the initial situation the switch SW does not conduct and no current passes through the switch. Also no current passes through the LEDs, the coil L or the resistor R and the voltage difference from ground across the resistor R is 0 V. Then, at time-instant $t_0$, a rising edge of the signal arrives at the control circuit SWC, which controls the switch into a conductive state. When the switch is conducting, current begins to pass through the switch, the coil L and the resistor R, but not through the LEDs because they have been connected in reverse bias. The current that passes through the coil increases linearly in accordance with the equation $$\frac{dI}{dt} = \frac{V_{bat}}{L} \qquad (1)$$

where I is the current passing through the coil, $V_{bat}$ is the voltage of the voltage source and L is the inductance of the coil L.

Alternatively, the switch can be set to control into a conductive state in response to a falling edge of the signal. Furthermore, for example, a sinusoidal signal or a signal of arbitrary form and even with a varying frequency can be used if the signal varies often enough and the control circuit can recognise the variations that take place.

As the current increases, the voltage drop that is formed across the resistor increases linearly in relation to the current in accordance with Ohm's law:

$$V=RI \qquad (2)$$

where R is resistance of the resistor R. When V reaches the reference voltage $V_{ref}$ at time-instant $t_1$, the comparator output becomes active, i.e. the comparator produces a termination message and causes the control circuit SWC to drive the electricity of the switch SW into an electrically non-conductive state. After the switch switches off the current, there is still energy $E_L$ stored in the coil L in accordance with the equation $$E_L = \frac{1}{2}LI^2 \qquad (3)$$

It should be noted that the energy does not depend on the voltage of the voltage source although the time for which the switch SW is in a conductive state does depend on it. The coil begins to follow the equation $$\frac{dI}{dt} = \frac{V_{FW}}{L} \qquad (4)$$

where $V_{FW}$ is the sum of the forward bias voltages of the LEDs connected in series. Because this voltage is in the opposite direction to the voltage that prevailed during the charging cycle, the rate of change of current di/dt, i.e. the change in the coil current is also contrary to the voltage that prevailed during the charging cycle, and the magnitude of the current begins to decrease. The coil creates a back electromotive force. In other words, the energy stored in the coil is discharged by the current $I_A$ through the LEDs at a voltage equal in size to their combined forward bias voltage, and the absolute value of the current $I_A$ decreases linearly. The voltage across the resistor drops to zero at the time-instant $t_2$ (because the switch switches off the current passing through the resistor), i.e. below the comparator's OFF threshold value, and the comparator output returns to a non-active state. The coil L continues to discharge until at time instant $t_3$ it has substantially emptied through the LEDs. At time-instant $t_4$, the control circuit SWC again receives a rising edge of the signal and begins to charge energy in the coil. Thus, during each cycle of the signal the coil discharges the same amount of energy. The signal frequency has a linear effect on the amount of energy that passes through the LEDs and, hence, the brightness of the LEDs. This provides a simple way to control the operation of the LEDs even steplessly, if so desired. For example, in mobile stations, their MCU, among other things, typically has several PWM (Pulse Width Modulation) outputs, which can also be easily used in the form of PFM.

In the circuit shown in FIG. 4, where the capacitor receives energy from the coil and releases energy to the illumination unit after termination of the connection cycle, the current $I_A$ in FIG. 5 represents the current that passes through the diode. The current that passes through the illumination organ remains significantly constant, if the capacitor has sufficient capacitance to supply the illumination unit with power from time-instant $t_3$ to time-instant $t_5$.

Typically, the applicable signal frequency is within the limits of 10 kHz and 1 MHz. Because the coil and the optional capacitor can be dimensioned smaller when using high frequencies, it is possible to adapt the circuit according to the invention to occupy less space by using higher frequencies. A disadvantage in the use of higher frequencies is increased radio frequency interference, interference conducted to the terminals of the voltage source, and increased power losses. To compensate for these disadvantages, the switch and the coil are preferably equipped with a suppressor circuit connected in parallel (e.g. a small capacitor or coil) to suppress the transient current caused by the switch SW and the LED or LEDs. In environments highly susceptible to interference, it is advantageous to use lower switching frequencies. Preferably, the switching frequency is optimised so that components, which are sufficiently small for the purpose can be used without, however, exceeding the acceptable level of interference. If it is desired to make the brightness of LEDs linearly adjustable according to the signal frequency, the components should preferably be dimensioned so that the time taken to charge and discharge the coil is in total shorter than the length of the signal cycle. On the other hand, if the length of the signal cycle is shorter, the switching operates in a so-called continuous operating mode, whereupon the current passing through the coil never has time to drop to zero.

Figure 6:
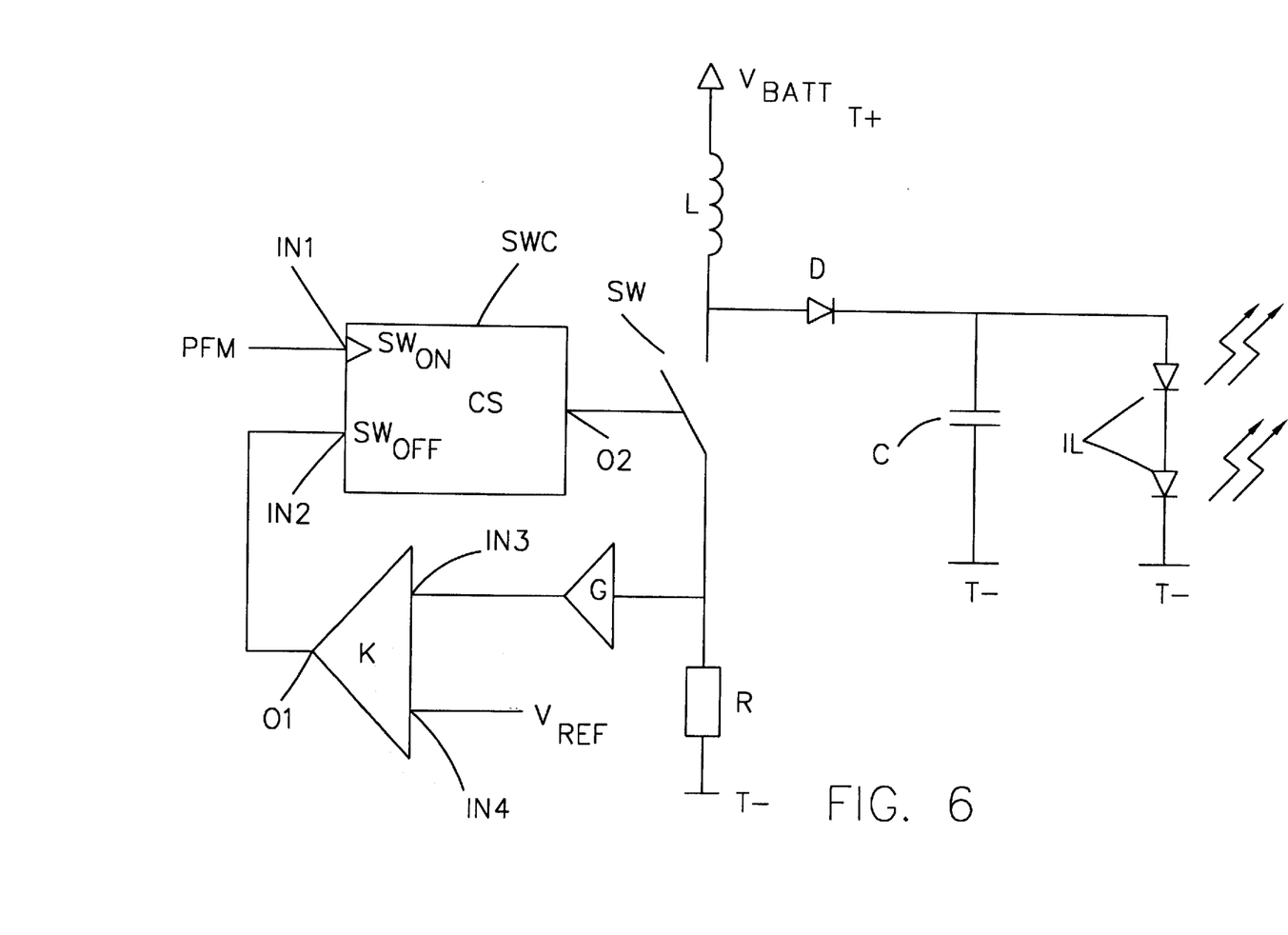
FIG. 6 is a circuit diagram of the illumination electronics of a device according to a third embodiment of the invention.

FIG. 6 presents a circuit diagram of an energy converter of a device according to a third embodiment of the invention. The circuit comprises a voltage source Batt, which has a positive terminal T+ and a negative terminal T−, which in this example is also ground. A first end of coil L is connected to the positive terminal. The second end of the coil is connected to two branches. The first branch has a switch SW, which is preferably a fast semiconductor switch, e.g. Field Effect Transistor (FET). In the first branch after the switch, there is a resistor R before the negative terminal. In the second branch, there is a diode D. In the second branch after the diode, there is a capacitor C and an illumination organ L, which comprises two LEDs, connected in parallel. The function of the diode is to prevent the current from flowing back into the coil from the capacitor. The capacitor and the illumination unit are connected at their first end to the diode and at their second end, they are grounded. The LEDs of the illumination unit are preferably connected in series but, however, so that the forward direction of the illumination unit is towards the ground.

When the switch is in a conductive state, a current passes through the coil and a magnetic field is produced around the coil. When the switch then becomes non-conductive, the coil forms a back electromotive force that generates a current through the diode and the illumination unit to ground. In addition, a shunt current is formed in the capacitor C, which charges energy therein. When the switch again becomes conductive once more, the voltage source again forms a current in the coil from the negative terminal to the positive terminal and the current no longer passes through the diode. While the coil again charges magnetic energy, the capacitor discharges the energy it stored, through the illumination unit thus prolonging the illumination period of the illumination unit. Alternatively, the circuit can be implemented without the diode and capacitor, whereupon the illumination unit ceases illumination for the duration of the charging period of the coil.

The circuit also comprises a feedback circuit according to FIG. 4.

FIGS. 4 and 6 show a circuit according to the invention where the switch is placed between the negative terminal (i.e. the earth) and the coil. Alternatively, the switch can be placed between the coil and the positive terminal as is shown in FIG. 3. Furthermore, the switch and the current measurement resistor can be placed on different sides of the coil, however, preferably so that the current measurement resistor is not between the coil and the illumination unit so that the current measurement resistor does not cause power loss for the current produced by the back electromotive force. Current measurement can also be implemented by making use of any method known from prior art, or other components may be used for detecting the threshold current.

Naturally, the invention can be implemented using a fixed frequency oscillator well known in the art. The oscillator may also be exclusively intended for the illumination electronics. In this case, however, the opportunity to adjust the brightness of the LEDs provided by the possibility of adjusting the switching frequency is lost. Although, for the sake of simplicity, the signal has been considered as having a constant frequency, a device according to the invention can also be implemented so that the signal has a continuously changing frequency. In order to produce illumination that appears uniform to the human eye, it is sufficient that the light energy produced during a given period of time (e.g. during 40 ms) is of the same magnitude during such successive periods, particularly when illumination in each period is formed of several light portions of the same size. Hence, the illumination may vary within very short periods, but the average illumination power still remains at least approximately constant so that the illumination appears to be non-blinking.

Naturally, the invention also applies to the use of LEDs other that those that produce visible light, such as infrared LEDs.

Using a circuit according to the invention, a good energy efficiency in raising the voltage of illumination can be achieved. Some applications of the invention also make use of a feature characteristic of the operation of an LED used for illumination, namely that neither the voltage nor the current has to be stable because the circuit is only used for illumination purposes and not, for example, for data transfer by light. According to the invention, the production of light portions of a standard size at a frequency independent of the voltage, leads to constant production of light even if the voltage of the voltage source becomes weaker or pulsates. The circuit is also economical to implement as it reduces the number of the circuit components (oscillator) according to prior art when using discrete components. The decrease in the number of components naturally reduces the probability of faults caused by defective components. The invention provides particularly good adjustability of illumination and using an arrangement according to the second and third embodiment it enables the use of a wide switching frequency range in illumination by improving the efficiency achieved at high switching frequencies.

Illumination according to the invention is extremely well suited for the illumination of colour displays of small portable mobile stations but, naturally, it is also suitable for the illumination of black-and-white displays, as well as for illumination also with LEDs other than those producing white or blue light. For example, the operating voltage of future devices will probably be even lower than that of current devices and the voltage obtained from the voltage source of some devices may prove to be lower than the forward voltage of LEDs on the market—independent of colour. Illumination is also very suitable for the background illumination of a keyboard, and it can be also used for illumination in different types of indicator lights or for integrating a small lamp into a device. Furthermore, one device according to the invention may have several step-up circuits, previously described for using separate LEDs of LEDs.

It will be appreciated that for reason of simplicity, the invention was discussed above assuming the components to be ideal. Thus, the operation of a device constructed according to the invention substantially corresponds to the one described here but, e.g. when the charge of a coil discharges through LEDs, part of the energy will be dissipated in internal resistances of the components used.

This paper presents the implementation and embodiments of the invention with the help of examples. A person skilled in the art will appreciate that the present invention is not restricted to details of the embodiments presented above and that the invention can also be implemented in other forms without deviating from the characteristics of the invention. For example, illumination power can also be changed by changing the threshold level of the comparator, that is, for example, by changing the reference voltage. The presented embodiments should be regarded as illustrative but not restricting. Thus, the possibilities of implementing and using the invention are only restricted by the enclosed claims, including equivalent implementations, also belong to the scope of the invention.

What is claimed is:

1. An illumination method for being performed by an electronic device, the device comprising illumination electronics, which method comprises:
   1) initiating charging of magnetic energy in electromagnetic conversion means and maintaining the charging;
   2) finishing charging when the amount of charged energy reaches a specified threshold level;
   3) allowing at least part of the charged energy to discharge into illumination means comprising an LED for producing light energy in response to the termination of the charging,
   4) receiving a signal independent of the operation of said illumination electronics for controlling the illumination; and
   5) returning to step 1) in response to said signal.

2. A method according to claim 1, wherein in response to termination of the charging, in Step 3)
   a first part of the charged energy is allowed to discharge into the illumination means that comprises the LED to produce light energy; and
   a second part of the charged energy is allowed to discharge into conservation means for later charging the energy in the illumination means for being discharged to produce light energy during Step 1).

3. A method according to claim 1, wherein said signal is cyclically pulsating, and the return from step 5) to step 1) takes place in response to a specified change in the signal.

4. A method according to claim 3, further comprising:
   adjusting the power of the light to be produced by changing the frequency of said cyclically pulsating signal.

5. A method according to claim 1, further comprising:
   receiving said signal from a digital circuit independent of the operation of the illumination electronics of said electronic device.

6. An electronic illuminating device comprising illumination electronics, which illumination electronics comprises:
   electromagnetic conversion means for charging magnetic energy;
   illumination means comprising an LED;
   initiation means for initiating the charging of magnetic energy into said electromagnetic conversion means and for maintaining the charging;
   terminating means for terminating the charging when the amount of charged energy has reached a specified threshold level;
   means for allowing at least part of the charged energy to discharge to said illumination means for producing light energy in response to the termination of the charging;
   a signal means for providing the illumination electronics with a signal independent of the operation of the illumination electronics; and
   said initiation means is arranged to initiate the charging in response to said signal.

7. A device according to claim 6, further comprising:
   conservation means for receiving a part of the charged energy; and
   selective coupling means for coupling the conservation means with the illumination means in response to the initiating of the charging of magnetic energy into said electromagnetic conversion means, in order to continue producing light energy using the part of the charged energy received by the conservation means.

8. A device according to claim 6, wherein
   said signal means is arranged to change the frequency of said independent signal for adjusting the power of illumination produced by the illumination means.

9. A device according to claim 6, wherein
   said signal is cyclically pulsating, and
   the initiation means is arranged to initiate the charging in response to a specified change that takes place in the signal.

10. A device according to claim 6, wherein:
    said terminating means is arranged to terminate the charging by switching off the charging current in response to the filling of the energy portion $E_L$ stored in the conversion means according to the equation $E_L = \frac{1}{2} L I_t^2$, where $E_L$ is the energy stored in the conversion means, L is the inductance of the conversion means and $I_t$ is the charging current at the instant of switching off the current;
    and the illumination means is arranged to produce an amount of light energy of a specific magnitude.

11. A device according to claim 6, which
    further comprises a means for generating a reference voltage; and
    said termination means comprises:
    means for generating a voltage difference proportional to the current that passes through the electromagnetic conversion means;

an amplifier for amplifying the voltage difference;

a comparator, which has inputs for receiving the voltage difference and the reference voltage, for comparing said voltage difference to the reference voltage; and an output for sending a termination message to the control means for commanding the control means to cause the terminating means to terminate the charging.

12. A device according to claim 6, further comprising:

interference suppression means connected in parallel with at least one of the following: the switch; the illumination means; and the electromagnetic conversion means.

13. A device according to claim 6, which comprises a mobile station.

14. A method according to claim 3, further comprising adjusting the power of the light to be produced by changing the frequency of said cyclically time-varying signal.

15. A device according to claim 6, wherein:

said signal is cyclically time-varying, and the initiation means is arranged to initiate the charging in response to a specified change in the signal.

16. A device according to claim 6, wherein:

said terminating means is arranged to terminate the charging by switching off the charging current in response to the energy $E_L$ stored in the conversion means reaching a specified threshold level, $E_L$ being defined according to the equation $E_L = \frac{1}{2} L I_t^2$, where $E_L$ is the energy stored in the conversion means, L is the inductance of the conversion means and $I_t$ is the charging current at the instant of switching off the current;

and the illumination means is arranged to produce an amount of light energy of specific magnitude.

17. A device according to claim 6, which further comprises:

a means for generating a reference voltage; and said termination means comprises:

means for generating a voltage difference proportional to the current that passes through the electromagnetic conversion means;

a comparator, which has inputs for receiving the voltage difference and the reference voltage, for comparing said voltage difference to the reference voltage; and an output for sending a termination message to the control means for commanding the control means to become non-conductive.

* * * * *